(12) United States Patent
Umei et al.

(10) Patent No.: US 7,869,688 B2
(45) Date of Patent: Jan. 11, 2011

(54) RECORDING APPARATUS

(75) Inventors: Tomomi Umei, Settsu (JP); Yoshiteru Mino, Hirakata (JP); Yasunori Yamamoto, Takatsuki (JP)

(73) Assignee: Panasonic Corporation, Osaka (JP)

( * ) Notice: Subject to any disclaimer, the term of this patent is extended or adjusted under 35 U.S.C. 154(b) by 1381 days.

(21) Appl. No.: 11/344,342

(22) Filed: Feb. 1, 2006

(65) Prior Publication Data

US 2006/0188235 A1    Aug. 24, 2006

(30) Foreign Application Priority Data

Feb. 1, 2005   (JP)   ............... 2005-025559

(51) Int. Cl.
*H04N 5/91* (2006.01)
(52) U.S. Cl. ..................... 386/46; 386/124
(58) Field of Classification Search ............ 386/46, 386/52, 56, 95, 101, 109, 111, 112, 124–126
See application file for complete search history.

(56) References Cited

U.S. PATENT DOCUMENTS

| 6,072,836 | A | 6/2000 | Hardiman |
| 2002/0094193 | A1 | 7/2002 | Tao et al. |
| 2004/0252982 | A1* | 12/2004 | Iwahara et al. ............ 386/111 |

FOREIGN PATENT DOCUMENTS

| JP | 2001-357613 | 12/2001 |
| JP | 2002-271742 | 9/2002 |
| JP | 2002-271744 | 9/2002 |
| JP | 2003-189243 | * 4/2003 |
| JP | 2003-174624 | 6/2003 |

OTHER PUBLICATIONS

Chinese Office Action issued in Patent Application No. 2006100017614 dated on Aug. 1, 2008.
Japanese Office Action issued in Japanese Patent Application No. 2005-025559, mailed Oct. 6, 2009.

* cited by examiner

*Primary Examiner*—Thai Tran
*Assistant Examiner*—Mishawn Dunn
(74) *Attorney, Agent, or Firm*—McDermott Will & Emery LLP

(57) ABSTRACT

The recording apparatus of the present invention: stores therein one or more recorded data pieces, each of which is created by encoding a video data piece, and one or more encoding information sets, each of which is information extracted when a different one of the video data pieces is encoded and represents characteristics of the video data piece; selects a recorded data piece based on the stored encoding information sets; creates a re-encoded data piece by re-encoding the selected recorded data piece using a predetermined encoding method; extracts a corresponding re-encoding information set in a course of creating the re-encoded data piece; and stores (a) the re-encoded data piece which replaces the selected recorded data piece and (b) the re-encoding information set which replaces an encoding information set corresponding to the selected recorded data piece.

1 Claim, 15 Drawing Sheets

FIG.2

| | REC001 | REC002 | REC003 |
|---|---|---|---|
| RECORDED-DATA-PIECE NAME | | | |
| ENCODING METHOD | MPEG-2 | MPEG-4 | MPEG-4 |
| AVERAGE BIT RATE (kbps) | 4096 | 256 | 512 |
| AMOUNT OF DATA (MB) | 900 | 180 | 200 |
| HIGH-BIT-RATE DISTRIBUTION | 50% | 30% | 60% |
| CUMULATIVE MOTION VECTOR VALUE | 100 | 350 | 200 |
| LOCATION INFORMATION (GB) | 11 | 6 | 8 |

| PROGRAM NAME | FOREIGN MOVIE X | DRAMA Y | FOREIGN MOVIE Z |
|---|---|---|---|
| NUMBER OF RECORDED DATA PIECES | 2 | 1 | 1 |
| RECORDED-DATA-PIECE NAME i | REC003 | REC100 | REC111 |
| RECORDED-DATA-PIECE NAME ii | REC200 | | |
| RECORDED-DATA-PIECE NAME iii | | | |

FIG.4

| PROGRAM NAME 4111 | GENRE 4112 | TIMER RECORDING DATE AND TIME 4113 | CHANNEL CODE 4114 | IMAGE-QUALITY MODE 4115 |
|---|---|---|---|---|
| ORIENTAL ART HISTORY | EDUCATION/ART | 20/6/2004 21:00-22:00 | 10 | HIGH DEFINITION |
| FOREIGN MOVIE SHOW | MOVIE | 23/6/2004 21:00-23:00 | 8 | STANDARD DEFINITION |

4110

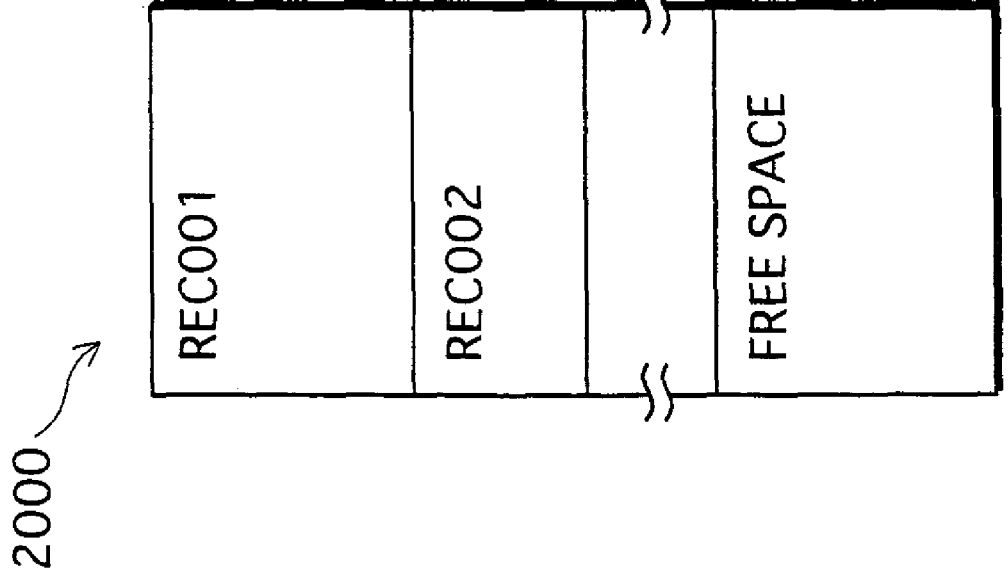
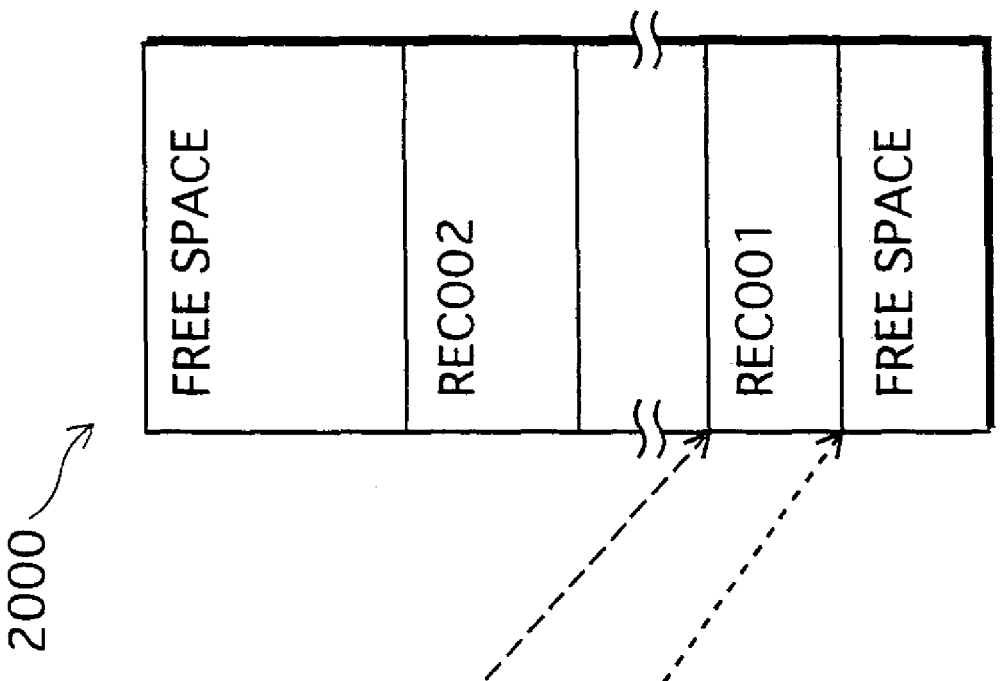

FIG.11A

| | | | |
|---|---|---|---|
| 2110 RECORDED-DATA-PIECE NAME | REC001 | REC002 | REC003 |
| 2120 ENCODING METHOD | MPEG-2 | MPEG-4 | MPEG-4 |
| 2130 AVERAGE BIT RATE (kbps) | 4096 | 256 | 512 |
| 2140 AMOUNT OF DATA (MB) | 900 | 180 | 200 |
| 2150 HIGH-BIT-RATE DISTRIBUTION | 50% | 30% | 60% |
| 2160 CUMULATIVE MOTION VECTOR VALUE | 100 | 350 | 200 |
| 2170 LOCATION INFORMATION (GB) | 11 | 6 | 8 |
| 2180 SIZE | 3 | 1 | 1 |

FIG.11B

| | | | |
|---|---|---|---|
| 2110 RECORDED-DATA-PIECE NAME | REC001 | REC002 | REC003 |
| 2120 ENCODING METHOD | MPEG-2 | MPEG-4 | MPEG-4 |
| 2130 AVERAGE BIT RATE (kbps) | 4096 | 192 | 512 |
| 2140 AMOUNT OF DATA (MB) | 900 | 150 | 200 |
| 2150 HIGH-BIT-RATE DISTRIBUTION | 50% | 45% | 60% |
| 2160 CUMULATIVE MOTION VECTOR VALUE | 100 | 290 | 200 |
| 2170 LOCATION INFORMATION (GB) | 11 | 15 | 8 |
| 2180 SIZE | 3 | 1 | 1 |

FIG.12A

| PROGRAM NAME | FOREIGN MOVIE X | DRAMA Y | FOREIGN MOVIE Z |
|---|---|---|---|
| NUMBER OF RECORDED DATA PIECES | 2 | 1 | 1 |
| RECORDED-DATA-PIECE NAME i | REC003 | REC100 | REC111 |
| RECORDED-DATA-PIECE NAME ii | REC200 | | |
| RECORDED-DATA-PIECE NAME iii | | | |

FIG.12B

| PROGRAM NAME | FOREIGN MOVIE X | DRAMA Y | FOREIGN MOVIE Z |
|---|---|---|---|
| NUMBER OF RECORDED DATA PIECES | 2 | 2 | 1 |
| RECORDED-DATA-PIECE NAME i | REC003 | REC80 | REC111 |
| RECORDED-DATA-PIECE NAME ii | REC200 | REC90 | |
| RECORDED-DATA-PIECE NAME iii | | | |

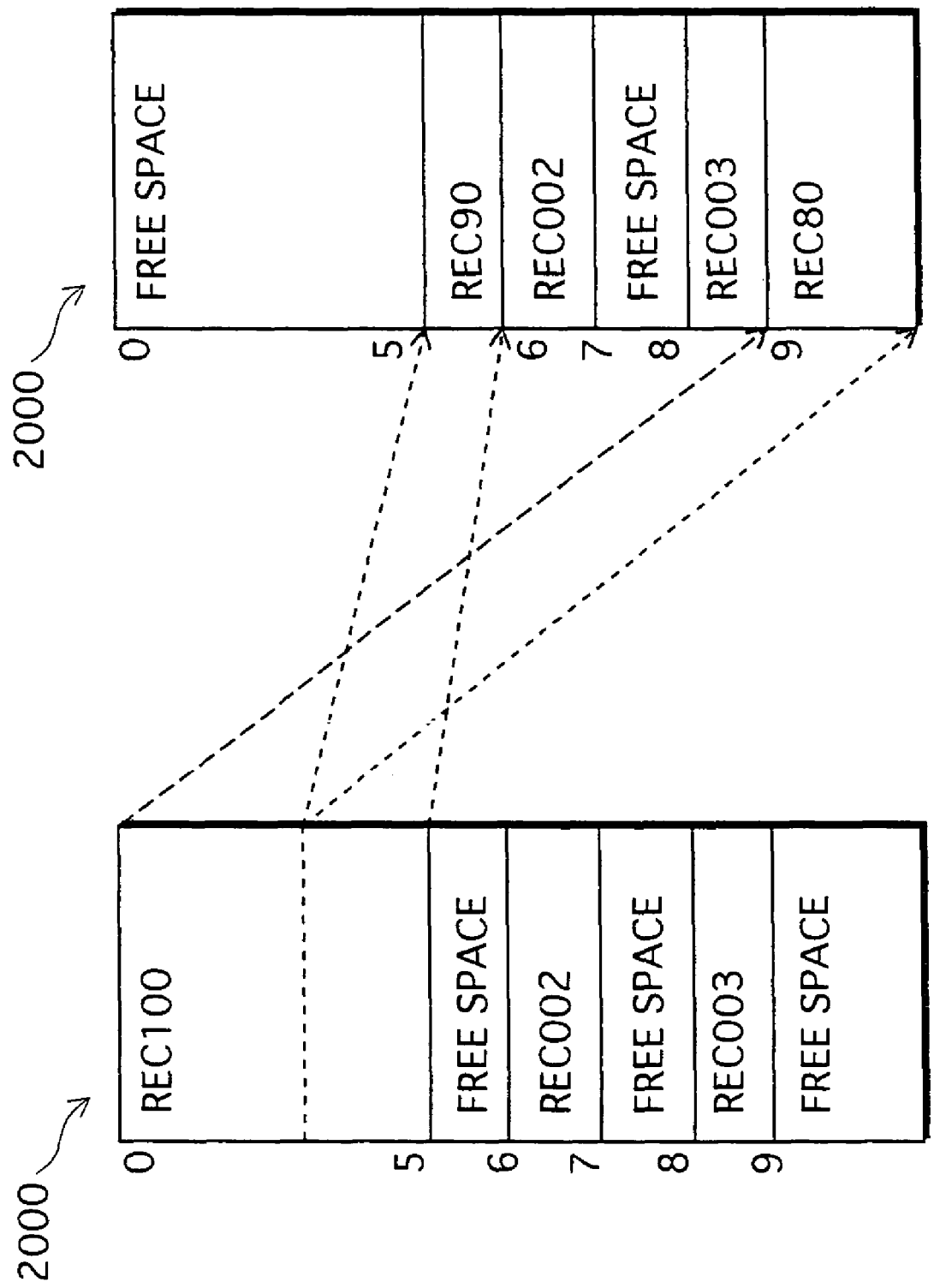

FIG.15A

| 2100 | RECORDED-DATA-PIECE NAME | REC001 | REC002 | REC003 |
|---|---|---|---|---|
| 2110 | ENCODING METHOD | MPEG-2 | MPEG-4 | MPEG-4 |
| 2120 | AVERAGE BIT RATE (kbps) | 4096 | 256 | 512 |
| 2130 | AMOUNT OF DATA (MB) | 900 | 180 | 200 |
| 2140 | HIGH-BIT-RATE DISTRIBUTION | 50% | 30% | 60% |
| 2150 | CUMULATIVE MOTION VECTOR VALUE | 100 | 350 | 200 |
| 2160 | LOCATION INFORMATION (GB) | 11 | 6 | 8 |
| 2170 | SIZE | 3 | 1 | 1 |

FIG.15B

| 2100 | RECORDED-DATA-PIECE NAME | REC001 | REC002 | REC003 |
|---|---|---|---|---|
| 2110 | ENCODING METHOD | MPEG-2 | MPEG-4 | MPEG-4 |
| 2120 | AVERAGE BIT RATE (kbps) | 512 | 256 | 512 |
| 2130 | AMOUNT OF DATA (MB) | 550 | 180 | 200 |
| 2140 | HIGH-BIT-RATE DISTRIBUTION | 20% | 30% | 60% |
| 2150 | CUMULATIVE MOTION VECTOR VALUE | 90 | 350 | 200 |
| 2160 | LOCATION INFORMATION (GB) | 20 | 6 | 8 |
| 2170 | SIZE | 2 | 1 | 1 |

RECORDING APPARATUS

BACKGROUND OF THE INVENTION

1. Field of the Invention

The present invention is related to storage recording technology for a video data recording apparatus, in particular to technology for improving the use efficiency of a recording medium.

2. Description of the Related Art

In late years, a wide variety of programs are broadcast on a number of channels through terrestrial, satellite and other broadcasting. Besides, people can enjoy a vast number of videos and music items on the Internet.

In accordance with the trend, high-capacity recording apparatuses have been developed that enables a great number of programs and the like to be recorded. As such recording apparatuses, the following has been offered: ones working with detachable recording media such as optical disks represented by DVD (Digital Versatile Disk); ones, so-called hybrid recorders, in which such a detachable recording medium and a built-in recording medium—for example, a high-capacity HDD (Hard Disk Drive)—are integrated.

Here, in the case when programs and the like are recorded, it is possible to record more programs by encoding data of the programs, which is digital data, to thereby reduce the amount of data and writing the encoded data to a recording medium.

Nonetheless, a recording medium has a limit to the amount of data to be recorded thereon.

Given this factor, technology has been proposed that allows to record more programs and the like without requiring deletion of existing programs recorded on a recording medium.

Such technology includes various techniques, for example: estimating the amount of video recording data of programs set for timer recording reservation, and adjusting the image quality according to the amount of free space on HDD when encoding is performed (see Patent Reference 1); reducing the amount of data by repetition of an encoding process according to selection conditions of data compression times and compression-target programs which are specified by the user (see Patent Reference 2); selecting compression targets according to genres, recorded dates and times and the like of recorded programs, and encoding the selected targets (see Patent Reference 3).

[Patent Reference 1] Japanese Laid-Open Patent Application Publication No. 2002-271742

[Patent Reference 2] Japanese Laid-Open Patent Application Publication No. 2002-271744

[Patent Reference 3] Japanese Laid-open Patent Application Publication No. 2003-174624

PROBLEM THAT THE INVENTION IS TO SOLVE

However, in these techniques, encoding target programs or the like are selected based on, for example, free space on a recording medium, the amount of data of programs to be recorded, user's directions and contents of recorded programs.

Therefore, depending on the contents of programs selected as encoding targets, unexpectedly severe degradation in image quality may be caused despite the user's intentions, and it is sometimes the case that the image quality becomes largely unsuitable for viewing. The degradation of image quality caused by repetition of such an encoding process is irreversible.

SUMMARY OF THE INVENTION

To that end, the present invention aims at offering a recording apparatus causing visually less noticeable degradation in image quality of encoded programs and the like, even if recorded programs are re-encoded to create free space on a recording medium.

In order to solve the above-stated problem, the present invention is a recording apparatus comprising: a storage unit operable to store one or more recorded data pieces, each of which is created by encoding a video data piece, and one or more encoding information sets, each of which is information extracted when a different one of the video data pieces is encoded and represents characteristics of the video data piece, the recorded data pieces being stored in one-to-one correspondence with the encoding information sets; a selecting unit operable to select a recorded data piece based on the stored encoding information sets; and an encoding unit operable to (i) create a re-encoded data piece by re-encoding the selected recorded data piece using a predetermined encoding method, (ii) extract a corresponding re-encoding information set in a course of creating the re-encoded data piece, and (iii) store, in the storage unit, (a) the re-encoded data piece which replaces the selected recorded data piece and (b) the re-encoding information set which replaces an encoding information set corresponding to the selected recorded data piece. Here, the predetermined encoding method causes a size of the re-encoded data piece to be smaller than a size of the selected recorded data piece.

In addition, each of the stored encoding information sets may include method information representing an encoding method in which a-corresponding recorded data piece has been encoded. In this case, the encoding unit (i-i) decodes the selected recorded data piece based on method information included in a corresponding encoding information set to thereby create a decoded data piece, (i-ii) re-encodes the generated decoded data piece using the predetermined encoding method to thereby create the re-encoded data piece, (ii) extracts the corresponding re-encoding information set in the course of the re-encoded data piece being created, and (iii) stores, in the storage unit, (a) the re-encoded data piece which replaces the selected recorded data piece and (b) the re-encoding information set which replaces the encoding information set corresponding to the selected recorded data piece.

According to the above structure, the recording apparatus of the present invention decides which recorded data piece to be encoded, taking into account characteristics of video data pieces of recorded programs and the like. As a result, it makes possible to ensure free space on a recording medium without causing unexpectedly severe degradation in image quality of the recorded data piece.

In addition, each of the stored encoding information sets may include a magnitude of change which is a numerical representation of changes in a video reproduced from a video data piece of a corresponding recorded data piece. In this case, the selecting unit selects the recorded data piece based on magnitudes of change included in the stored encoding information sets.

In addition, the magnitude of change may be a bit-rate value of the video data piece per a certain time period. In this case, the selecting unit selects the recorded data piece, a corresponding encoding information set of which includes a larger bit-rate value than a predetermined value.

In addition, the magnitude of change may be a motion vector value representing inter-frame displacement of the video data piece. In this case, the selecting unit selects the recorded data piece, a corresponding encoding information set of which includes a larger motion vector value than a predetermined value.

Herewith, the recording apparatus is capable of selecting a recorded data piece having large changes in video as a target for encoding, which results in less noticeable degradation in image quality of a re-encoded data piece even when free space is ensured.

In addition, the storage unit may further store one or more content information sets, each of which relates to contents of a different one of the stored recorded data pieces. In this case, the selecting unit selects the recorded data piece based on the content information sets and the magnitudes of change.

Herewith, the recording apparatus is capable of selecting a recorded data piece for encoding, taking into account contents of recorded data pieces, which allows to select a recorded data piece causing further less noticeable degradation in image quality.

The recording apparatus of the present invention may further comprises: a free-space-amount detecting unit operable to detect an amount of free space in the storage unit. Here, in a case when the detected amount of free space is smaller than an amount of a recorded data piece to be newly stored, the selecting unit selects the recorded data piece based on the stored encoding information sets, and the encoding unit (i) creates the re-encoded data piece by re-encoding the selected data piece using the predetermined encoding method, (ii) extracts the corresponding re-encoding information set in the course of creating the re-encoded data piece, and (iii) stores, in the storage unit, (a) the re-encoded data piece which replaces the selected recorded data piece and (b) the re-encoding information set which replaces the encoding information set corresponding to the selected recorded data piece.

In addition, the recording apparatus of the present invention may further comprise: a timer recording unit operable to receive timer recording reservation for a program, which is a video data piece, and store, in the storage unit, program information identifying the program of the timer recording reservation; and a data amount estimating unit operable to estimate an amount of data of the video data piece when being encoded. Here, the amount of a recorded data piece to be newly stored is the estimated amount of data.

Herewith, the recording apparatus is capable of ensuring space in order to record programs for which timer recording reservation has been set. This allows to record programs for timer recording without fail.

In addition, the recording apparatus of the present invention may further comprise: an encoding-method deciding unit operable to decide to adopt, as the predetermined encoding method, (i) an encoding method with high compression efficiency in a case when the detected amount of free space is smaller than a certain amount, and (ii) an encoding method causing less degradation of image quality in a case when the detected amount of free space is larger than the certain amount. Here, the encoding unit encodes the selected recorded data piece using the adopted encoding method.

Herewith, the recording apparatus is capable of changing the encoding method according to the size of free space on a recording medium, which allows to record a program and the like in the best possible image quality.

In addition, the recording apparatus of the present invention may further comprise: a reproducing unit operable to reproduce at least one of the stored recorded data pieces. Here, the reproducing unit extracts, in a case when an encoding information set corresponding to the at least one recorded data piece is not stored in the storage unit, the encoding information set in a course of decoding the at least one recorded data piece, and stores, in the storage unit, the encoding information set in correspondence with the at least one recorded data piece.

Herewith, even if a recorded data piece is stored whose encoding information set has not been created, the recording apparatus is capable of creating the encoding information set when the recorded data piece is reproduced. Therefore, the recording apparatus can make a recorded data piece a target for encoding by reproducing it once.

In addition, each of the stored encoding information sets may include sequence information indicating a reproduction order of a corresponding recorded data piece. In this case, the reproducing unit reproduces the stored recorded data pieces sequentially based on the sequence information.

Herewith, the recording apparatus is capable of reproducing recorded data pieces in the reproduction order even if a program has been divided into two or more recorded data pieces.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIG. 2 shows a structure and a content example of encoding information sets 2100;

FIG. 3 shows a structure and a content example of program management information sets 2200;

FIG. 4 shows a structure and a content example of timer recording information sets 4110;

FIGS. 5A and 5B show content examples of a recorded-data storage unit 2000 before and after re-encoding of a recorded data piece, respectively;

FIGS. 11A and 11B show examples of an encoding information set before and after re-encoding, respectively;

FIGS. 12A and 12B show examples of a program management information set before and after the re-encoding, respectively;

FIGS. 13A and 13B show examples of a recorded-data storage unit 2000 before and after re-encoding, respectively;

FIG. 8); and FIGS. 15A and 15B show examples of encoding information sets before and after re-encoding, respectively.

DESCRIPTION OF THE PREFERRED EMBODIMENT

Brief Overview

Since compressing video data by encoding involves a reduction in bit rate for the encoding, it is inevitable that the reduced-bit-rate encoding results in degradation of the image quality.

Then, the inventors of the present invention focused attention on the fact that there are videos causing visually less noticeable degradation in image quality after encoding, even if the encoding is performed at a reduced bit rate. In light of this fact, the present invention aims at offering a recording apparatus for selecting and encoding video data that causes visually less noticeable degradation in image quality involved with the encoding.

Next is described an embodiment of a recording apparatus according to the present invention.

The present embodiment explains an apparatus for recording and reproducing TV broadcast programs.

The video recording and reproducing apparatus has a HDD built-in, and records TV programs according to a timer recording schedule. In addition, this video recording and reproducing apparatus also has functions (i) to check the amount of free space on the HDD when the user adds another program for timer recording as well as when a predetermined time comes, and, (ii) if not much amount of free space is left, to make free space by automatically selecting and then re-encoding an existing recorded program.

<Structure>

Figure 1:
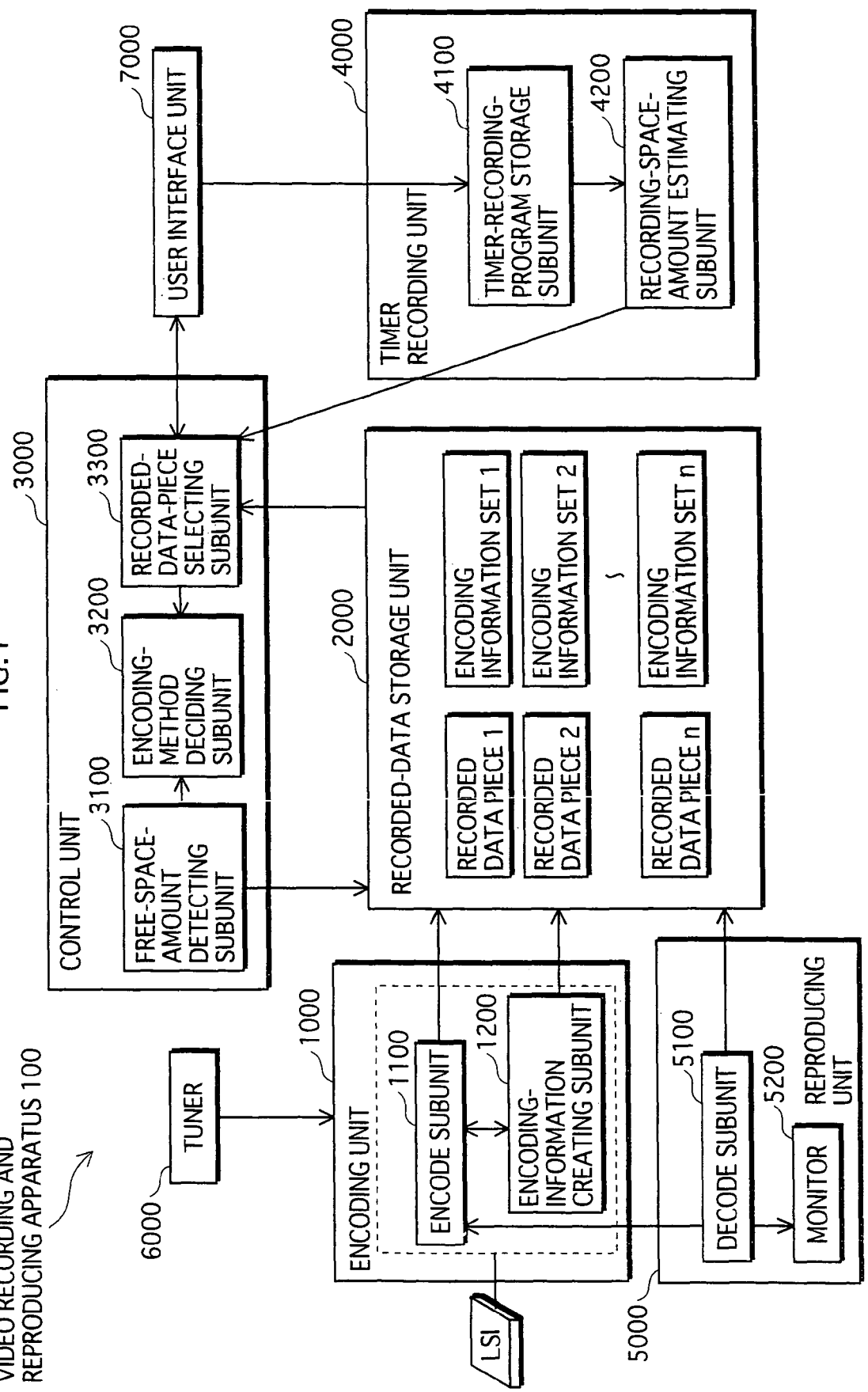
FIG. 1 is a functional block diagram showing a structure of a video recording and reproducing apparatus 100 according to the present invention.

FIG. 1 is a functional block diagram showing a structure of a video recording and reproducing apparatus 100 according to the present invention.

The video recording and reproducing apparatus 100 comprises: an encoding unit 1000; a recorded-data storage unit 2000; a control unit 3000; a timer recording unit 4000; a reproducing unit 5000; a tuner 6000; and a user interface unit 7000.

The encoding unit 1000 includes an encode subunit 1100 and an encoding-information creating subunit 1200.

The encode subunit 1100 has a function to create recorded data by encoding data of each program and cause the recorded-data storage unit 2000 to store the recorded data therein. Hereinafter, the term "encoding-target data piece" refers to all or part of data of a program that is a target for encoding operation. In addition, the term "recorded data piece" refers to all or part of data of a program, on which the encoding operation has already been performed.

Here, the following two types are considered as encoding-target data: program data of each TV broadcast program received by an external antenna; and recorded data stored in the recorded-data storage unit 2000.

Each piece of encoding-target data of the former type is a digital signal converted from a program on a channel selected by the tuner 6000 and received from the tuner 6000. Each piece of encoding-target data of the latter type is a recorded data piece read from the recorded-data storage unit 2000 via the reproducing unit 5000.

That is, a former-type data piece is data of a program to be newly recorded, while a latter-type data piece, on which the encoding operation has already been performed, is to be encoded once again—hereinafter, referred to simply as "re-encoded"—in order to create free space on a recording medium.

The encoding-information creating subunit 1200 has a function to extract, in the course that the encode subunit 1100 encodes an encoding-target data piece, an encoding information set of the encoding-target data piece each time and cause the recorded-data storage unit 2000 to store the encoding information set therein. This encoding information set is not contents of a program, but is information indicating attributes of the encoding-target data piece. The details are explained with the aid of FIG. 2.

The recorded-data storage unit 2000 has a function to store: recorded data pieces, each of which is an encoding-target data piece having been encoded by the encode subunit 1100; and encoding information sets extracted by the encoding-information creating subunit 1200. In the present embodiment, the recorded-data storage unit 2000 is the built-in HDD (Hard Disk Drive).

The recorded data pieces correspond one-to-one with the encoding information sets, and, as a general rule, the same number of each should be stored.

The control unit 3000 includes: a free-space-amount detecting subunit 3100; an encoding-method deciding subunit 3200; and a recorded-data-piece selecting subunit 3300.

The free-space-amount detecting subunit 3100 has a function to detect the amount of free space of the recorded-data storage unit 2000.

The recorded-data-piece selecting subunit 3300 has a function to select, from among recorded data pieces stored in the recorded-data storage unit 2000, a recorded data piece to be re-encoded next. In this selection, a recorded data piece best suited for re-encoding is selected based, for example, on encoding information sets stored in the recorded-data storage unit 2000.

The encoding-method deciding subunit 3200 has a function to decide to adopt the most appropriate encoding method in order to re-encode the recorded data piece selected by the recorded-data-piece selecting subunit 3300. The most appropriate method is decided based on such as the encoding information set of the recorded data piece to be re-encoded and the amount of free space of the recorded-data storage unit 2000. As to the encoding method here, only a video compression coding standard, such as MPEG-2 or MPEG-4, can be specified. Furthermore, a bit-rate value can also be specified for encoding, in addition to the video compression coding standard.

After the encoding method is decided, the recorded data piece selected by the recorded-data-piece selecting subunit 3300 is encoded by the encode subunit 1100 of the encoding unit 1000 using the encoding method decided by the encoding-method deciding subunit 3200.

In addition to the function of controlling functions concerning the present invention, the control unit 3000 also has functions owned by a general video recording and reproducing apparatus—for example, a function to interpret user directions and control each functional unit.

The timer recording unit 4000 has a function to receive a direction to record a program from the user via the user interface unit 7000, and set a timer-recording for the program.

The timer recording unit 4000 includes: a timer-recording-program storage subunit 4100; and an recording-space-amount estimating subunit 4200.

The timer-recording-program storage subunit 4100 has a function to store information related to a program specified by the user for a timer recording. The stored information related to a timer recording program is described hereinafter with the aid of FIG. 3.

The recording-space-amount estimating subunit 4200 has a function to calculate how much space will be required to record the program set for timer recording reservation, based on the timer-recording-program-related information stored in the timer-recording-program storage subunit 4100.

The reproducing unit 5000 includes: a decode subunit 5100; and a monitor 5200.

The decode subunit 5100 has a function to decode a recorded data piece to obtain its original data of a program.

Here, there are two output destinations for the decoded data of a program: the monitor 5200 and the encode subunit 1100. In the case of re-encoding a recorded data piece, the decoded data is output to the encode subunit 1100.

The monitor 5200 has a function to display the data decoded by the decode subunit 5100 on its screen. The monitor 5200 is included in the video recording and reproducing apparatus 100 as one of the components in the present embodiment; however, it may be provided as an external device instead.

The user interface unit 7000 includes, for example, an operation panel, a remote controller, a display, and an indicator of the video recording and reproducing apparatus 100, and has a function of exchanging information with the user—such as information presentation to the user and transmission and reception of user's directions.

Each function of the video recording and reproducing apparatus 100 is achieved by a CPU executing a program stored in memory or hard disk of the video recording and reproducing apparatus 100.

<Data>

The following describes main data used in the video recording and reproducing apparatus 100 with the aid of FIGS. 2 to 4.

FIG. 2 shows a structure and a content example of encoding information sets 2100.

The encoding information sets 2100 are information stored in the recorded-data storage unit 2000, and are paired with the recorded data pieces stored therein.

In addition, the encoding information sets 2100, mainly including ones extracted in the course that the encode subunit 1100 encodes encoding-target data pieces, are created by the encoding-information creating subunit 1200.

Each encoding information set 2100 comprises: a recorded-data-piece name 2110; an encoding method 2120; an average bit rate 2130; an amount of data 2140; a high-bit-rate distribution 2150; a cumulative motion vector value 2160; and location information 2170.

The recorded-data-piece name 2110 is an identifier of each stored recorded data piece in correspondence with a different encoding information set 2100.

The encoding method 2120 indicates the encoding method of each stored recorded data piece in correspondence with a different encoding information set 2100. The stored recorded data piece has been encoded by the encode subunit 1100 using this encoding method 2120, which is referred by the decode subunit 5100 for decoding the recorded data piece.

The encoding methods include, for examples MPEG-2 (Moving Picture Experts Group phase 2) and MPEG-4 (Moving Picture Experts Group phase 4).

The average bit rate 2130 is a bit rate functioning as an index when the encode subunit 1100 encodes an encoding-target data piece, and represents bits per second.

The amount of data 2140 is the size of a recorded data piece which has been encoded. If the average bit rate 2130 is large, the amount of data 2140 is also large.

The high-bit-rate distribution 2150 represents the percentage of the time during which the bit rate of the recorded data piece becomes greater than the average bit rate 2130. For example, if a recorded data piece, of a thirty-minute program, includes 10 minutes of the high bit rate period, the high-bit-rate distribution 2150 is 33%.

For example, as to an encoding method like MPEG-2, a variable bit rate is used for encoding, and its bit rate varies for each video scene. Therefore, it is possible to calculate the time during which the bit rate is exceeding a certain value.

This is because such an encoding method utilizes a difference from a scene to the next as information (i.e. data) and, accordingly, requires more information for scenes with high motion and rapid changes in order to maintain the same image quality.

For this reason, the larger the value of the high-bit-rate distribution 2150, the larger the amount of changes in video of the program.

The cumulative motion vector value 2160 is calculated by adding the magnitudes of so-called motion vectors. To be more specific, the cumulative motion vector value 2160 is found by adding motion vectors at regular time intervals and calculating the average of the accumulated motion vectors. For example, the cumulative motion vector value 2160 for a thirty-minute program is determined by adding motion vectors every ten minutes and taking the average of the three accumulated motion vectors.

That is, an encoding method like MPEG-2, for example, estimates a direction in which an object moves within an image frame or between frames, and stores only the vector.

Therefore, the larger the absolute value of the vector, the larger the motion of the object.

In sum, the larger the cumulative motion vector value 2160, the larger the motion of the video or the larger the amount of changes.

The location information 2170 indicates a location within the recorded-data storage unit 2000, where a corresponding recorded data piece is stored.

For example, a recorded data piece whose recorded-data-piece name 2110 is "REC001" has been encoded using the encoding method 2120 "MPEG-2" at the bit rate 2130 of "4096" kbps. Additionally, the recorded data piece has the amount of data 2140 of "900" MB, while having video characteristics represented by the high-bit-rate distribution 2150 of "50%" and the cumulative motion vector value 2160 of "100". Furthermore, the recorded data piece is stored, within the recorded-data storage unit 2000, in a section starting from a position represented by the location information 2170 of "11" GB (gigabytes).

FIG. 3 shows a structure and a content example of program management information sets 2200.

The program management information sets 2200 show correspondences between recorded programs and recorded data pieces, and are stored in the recorded-data storage unit 2000.

Each program management information set 2200 comprises: a program name 4111; the number of recorded data pieces 2201; a recorded-data-piece name i 2202; a recorded-data-piece name ii 2203; and a recorded-data-piece name iii 2204.

The program name 4111 is an identifier used for identifying each of the recorded programs, and is the name of the program in the present embodiment. Instead of program names, codes or the like identifying individual programs may be used.

The number of recorded data pieces 2201 shows how many recorded data pieces there are for a corresponding stored program.

This information is necessary because, when recorded data of a single program does not fit in a continuous stretch of free space, it is divided and stored in two or more sections.

Each of these divided and stored video-recorded data pieces is a target for selection by the recorded-data-piece selecting subunit 3300 for re-encoding.

The recorded-data-piece names i, ii and iii (2202 to 2204) are recorded-data-piece names 2110 under which encoding-target data pieces are stored. Here, for example, the recorded data piece of the recorded-data-piece name i is continuous with the recorded data piece of the recorded-data-piece name ii. In the case of the present embodiment, a single program can be divided into up to three recorded data pieces.

For instance, the recorded data of a program whose program name 4111 is "FOREIGN MOVIE X" is stored after being divided into "2" pieces—i.e. the number of the recorded data pieces 2201, and their recorded-data-piece names are "REC003" and "REC200", respectively. It is possible to re-encode only a recorded data piece represented by the recorded-data-piece name "REC003", or re-encode only a recorded data piece represented by the recorded-data-piece name "REC200".

FIG. 4 shows a structure and a content example of timer recording information sets 4110.

The timer recording information sets 4110 are information of programs for which the user have made-timer recording reservation, and are stored in the timer-recording-program storage subunit 4100.

Each timer recording information set 4110 comprises: a program name 4111; a genre 4112; a timer recording date and time 4113; a channel code 4114; and an image-quality mode 4115.

First, the program name 4111 is a name of a program for which the user has set timer recording reservation. The program name 4111 is the same as the program name of the program management information 2200.

The genre 4112 shows a genre of a program represented by the program name 4111.

The timer recording date and time 4113 is a broadcast date and time of a program represented by the program name 4111.

The channel code 4114 shows a broadcast channel of a program represented by the program name 4111.

The image-quality mode 4115 represents an image-quality mode in which the user desires to record the program. It is presumed that, if the image-quality mode is "HIGH DEFINITION", the user wishes to watch the program without lowering the image quality.

For example, a program whose program name 4111 is "ORIENTAL ART HISTORY" belongs to the genre 4112 of "EDUCATION/ART", and is broadcast at "21:00-22:00" on "20/6/2004" on channel "10". In addition, the user has requested to record the program in the image-quality mode of "HIGH DEFINITION".

<Operations>

The following explains operations of the above-stated video recording and reproducing apparatus 100 with the aid of FIGS. 5 to 14.

First, an example is provided, using FIG. 5, in which free space of the recorded-data storage unit 2000 is increased by re-encoding a recorded data piece.

FIGS. 5A and 5B show content examples of the recorded-data storage unit 2000.

While FIG. 5A shows a content example before re-encoding of a recorded data piece, FIG. 5B shows a content example after the re-encoding. As a matter of convenience, these figures show recorded data pieces only, and encoding information sets stored in correspondence with the recorded data pieces are not shown (same applies to FIG. 13). This is because the size of each encoding information set 2100 is comparatively smaller than that of the recorded data piece.

FIGS. 5A and 5B illustrate an example of re-encoding the recorded data piece "REC001". The data size of "REC001" after the re-encoding (see FIG. 5B) is smaller than that of "REC001" before the re-encoding (see FIG. 5A), and the section where the original "REC001" was stored becomes free space. Accordingly, the overall free space has increased.

In the present embodiment, the encoding information sets 2100 of all the recorded data pieces are collectively grouped together; however, it may be stored with respect to each recorded data piece instead.

Next are described operations of the present embodiment.

The present embodiment describes the case in which free space is created in the recorded-data storage unit 2000 in order to ensure space for recording a program for which the user has made timer recording reservation.

The following describes three operations separately. First, a description is provided of a flow of an freeing up process of free space when the timer recording reservation is made. Second, a process of selecting a recorded data piece for re-encoding is explained, which is then followed by a description of a process of re-encoding a selected recorded data piece.

<1. Freeing Up Process as Timer Recording Reservation is Made>

Figure 6:
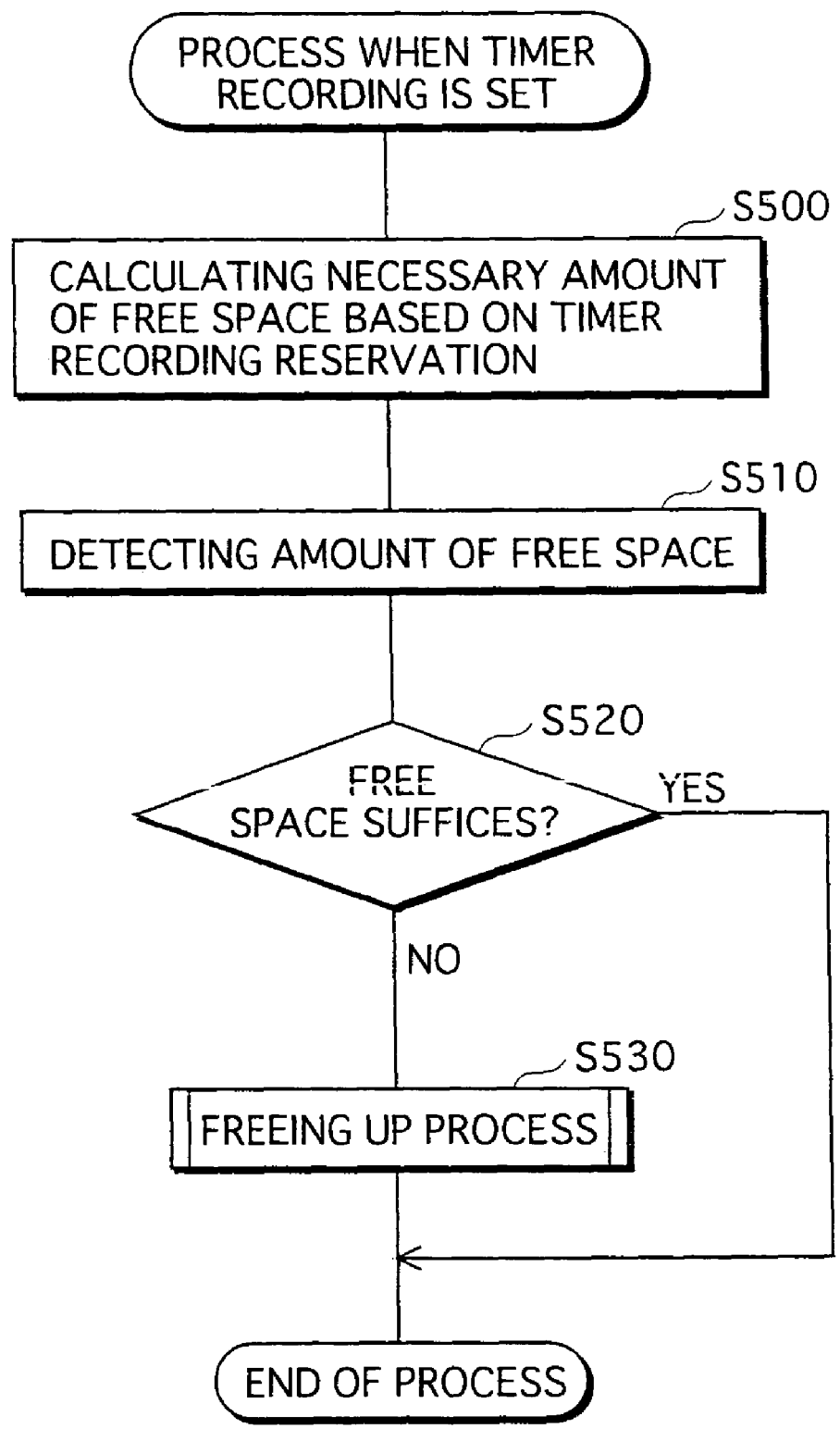
FIG. 6 is a flowchart showing a process when a timer recording reservation is made.
Figure 7:
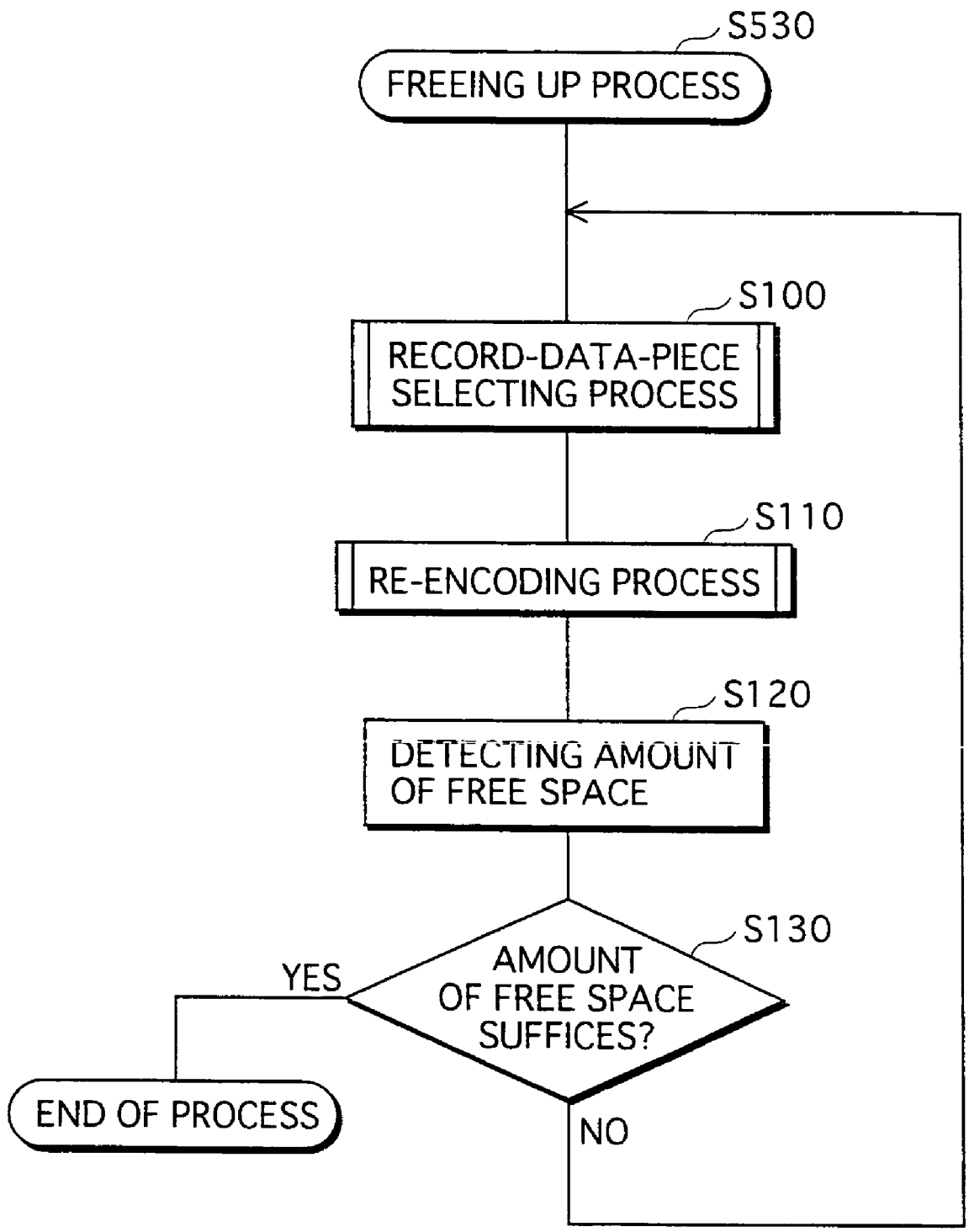
FIG. 7 is a flowchart showing a freeing up process for ensuring free space.

FIGS. 6 and 7 are used for description here.

FIG. 6 is a flowchart showing a process when timer recording reservation is made, while FIG. 7 is a flowchart showing a freeing up process to ensure free space.

In the present embodiment, assume that a process for ensuring free space is performed at 3 a.m. every day so as to record programs for which timer recording reservation within a 24-hour period until 3 a.m. of the following day has been set. In addition, when a timer recording is newly set for another program and if the program is broadcast by 3 a.m. of the following day; the freeing up process is carried out once again. Note that the time, here 3 a.m., can be specified at the discretion of the user. Or alternatively, an ideal time is found according to a recording history and set automatically.

Here, a process when the timer recording reservation is made is described with the aid of FIG. 6.

The user sets timer recordings for programs that the user wishes to record, via the user interface unit 7000.

After receiving the timer recording reservation from the user, the user interface unit 7000 creates the timer recording information sets 4110 (see FIG. 4) of the programs, and stores these in the timer-recording-program storage subunit 4100.

For example, assume that it is currently noon of 20 Jun. 2004, and the user has set a timer recording to record, in HIGH DEFINITION, the program "ORIENTAL ART HISTORY" being broadcast from 21:00 today on channel 10. In this case, the timer recording information set 4110 looks like one shown in FIG. 4.

After receiving the timer recording reservation of the program from the user, the user interface unit 7000 causes the timer-recording-program storage subunit 4100 to store the timer recording information sets 4110 therein, and informs the control unit 3000 that the timer recording reservation has been made.

After being informed that the timer recording reservation for programs has been made, the control unit 3000 requests the recording-space-amount estimating subunit 4200 to calculate the amount of space estimated (hereinafter, referred to as "estimated amount of space") to be required when the programs are recorded. Here, all programs to be recorded by 3 a.m. of the following day are subject.

At the same time, the control unit 3000 requests the free-space-amount detecting subunit 3100 to detect the amount of free space in the recorded-data storage unit 2000.

After receiving the request of calculating the estimated amount of space, the recording-space-amount estimating subunit 4200 reads, from the timer-recording-program storage subunit 4100, information of programs to be recorded within the 24-hour period, and calculates the estimated amount of space (Step S500). As to programs of which estimated amounts of space were previously calculated, the estimated amounts of space have been stored. The control unit 3000 is then informed of the total estimated amount of space, which is calculated by summing the estimated amounts of space for all programs to be recorded within the 24-hour period. In the case of the timer recording information sets 4110 shown in FIG. 4, for example, only the estimated amount of space for the program name 4111 "ORIENTAL ART HISTORY" is the total estimated amount of space.

The estimated amount of space of each program is calculated from a recording time of the timer recording date and time 4113 and the image-quality mode 4115 of a timer recording program. In the case of the present embodiment, when the image-quality mode 4115 is "HIGH DEFINITION", encoding is carried out using MPEG-2 at a bit rate of 8 Mbps. On the other hand, when the image-quality mode 4115 is "STANDARD DEFINITION", encoding is performed with MPEG-2 at a bit rate of 4 Mbps. These encoding method and bit rate may be fixed for the recording apparatus, or may be specified by the user.

For instance, as to the program whose program name 4111 is "ORIENTAL ART HISTORY", two hours of recording time, as shown in the timer recording date and time 4113 "20/6/2004 21:00-22:00", has been specified and the image-quality mode 4115 is "HIGH DEFINITION", and therefore, the estimated amount of space becomes approximately 7.5 GB.

On the other hand, the free-space-amount detecting subunit 3100, after receiving the request to detect the amount of free space, checks the recorded-data storage unit 2000, detects free space (Step S510), and then informs the control unit 3000 of the free space.

The free space, here, means not the amount of continuous free space, but a sum of free space scattered in the recorded-data storage unit 2000.

Informed of the estimated amount of space and the total amount of free space by the recording-space-amount estimating subunit 4200 and the free-space-amount detecting subunit 3100, respectively, the control unit 3000 compares these values, and judges whether programs of timer recording reservation can be recorded (Step S520).

In the case where the total amount of free space is smaller than the estimated amount of space, the freeing up process (Step S530) to ensure free space is performed. On the other hand, when the total amount of free space is larger than the estimated amount of space, the current process is finished.

Next is described the freeing up process with the aid of FIG. 7.

FIG. 7 is a flowchart showing the freeing up process to ensure free space.

After determining that the freeing up process (Step S530) is necessary, the control unit 3000 requests the recorded-data-piece selecting subunit 3300 to select a recorded data piece for the re-encoding process. When making the request, the control unit 3000 informs the recorded-data-piece selecting subunit 3300 of the estimated amount of space and the total amount of free space informed by the recording-space-amount estimating subunit 4200 and the free-space-amount detecting subunit 3100, respectively.

After being requested the selection of a recorded data piece, the recorded-data-piece selecting subunit 3300 reads the encoding information sets 2100 stored in the recorded-data storage unit 2000, and selects a recorded data piece for re-encoding based on the read encoding information sets 2100 as well as the estimated amount of space and total amount of free space informed by the control unit 3000 (Step S100). The recorded-data-piece selecting subunit 3300 informs the control unit 3000 of the recorded-data-piece name 2110 of the selected recorded data piece.

After informed of the selected recorded-data-piece name 2110, the control unit 3000 informs the encoding unit 1000 of the selected recorded-data-piece name 2110 and places a request of the re-encoding process.

After receiving the request, the encoding unit 1000 performs the re-encoding process, and informs the control unit 3000 of the completion of the process (Step S110).

After informed of the completion of the re-encoding process, the control unit 3000 requests the free-space-amount detecting subunit 3100 to detect the amount of free space of the vide-recorded-data storage unit 2000.

After receiving the request, the free-space-amount detecting subunit 3100 detects the amount of free space of the recorded-data storage unit 2000 (Step S120), and informs this to the control unit 3000.

The control unit 3000 compares the informed amount of free space and the estimated amount of space, and finishes the current process if the amount of free space is larger than the other (Step S130: YES).

If the amount of free space is smaller than the estimated amount of space (Step S130: NO), the control unit 3000 repeats the freeing up process (Steps S100 to S130).

<2. Selecting Process of Recorded Data Piece for Re-Encoding>

Figure 8:
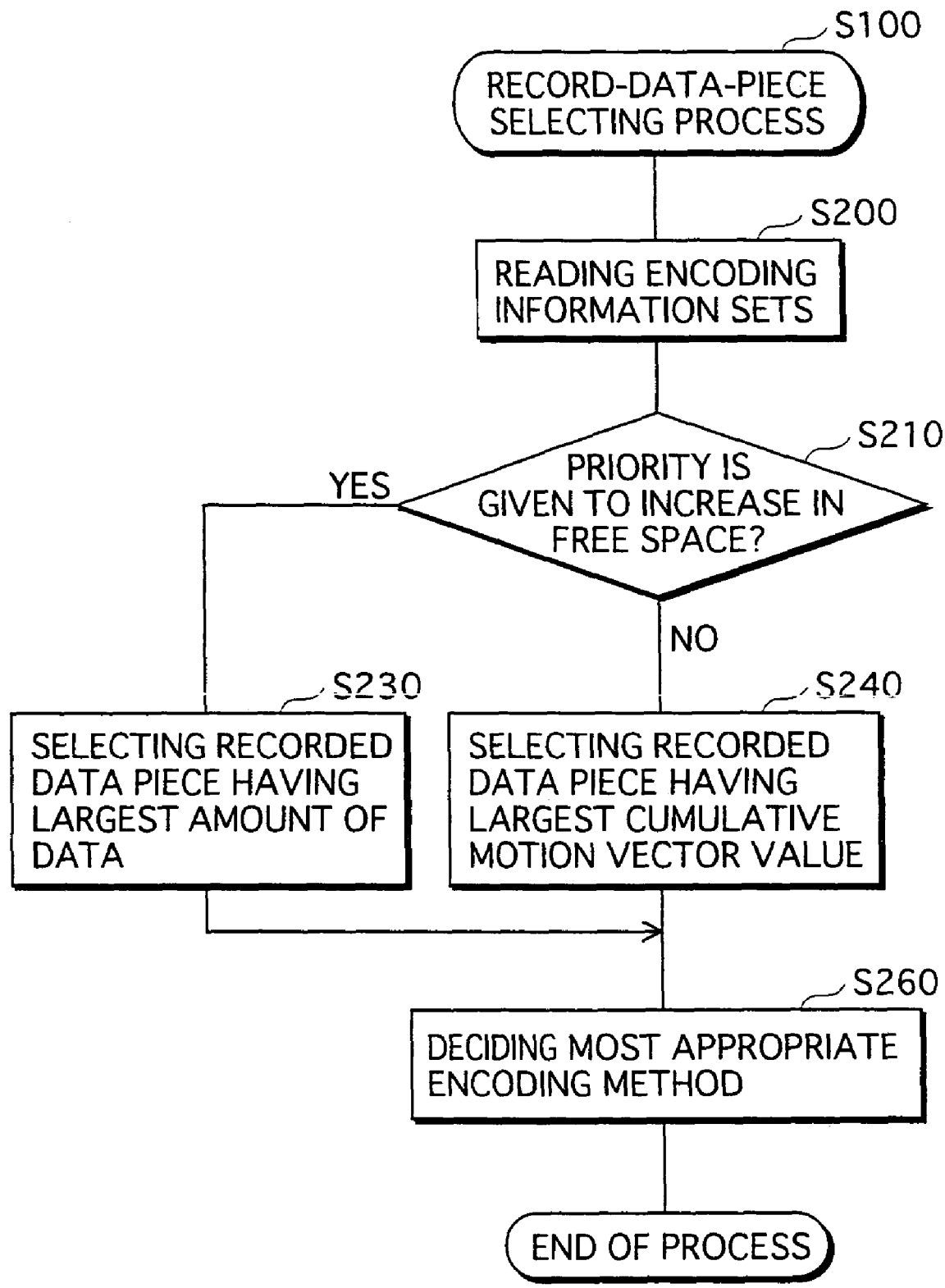
FIG. 8 is a flowchart showing a process for selecting a recorded data piece for re-encoding.

The recorded-data-piece selecting process (Step S100) is described with the aid of FIG. 8.

FIG. 8 is a flowchart showing the process for selecting a recorded data piece for re-encoding.

The control unit 3000 requests the recorded-data-piece selecting subunit 3300 to select a recorded data piece. When making the request, the control unit 3000 informs the recorded-data-piece selecting subunit 3300 of the estimated amount of space informed by the recording-space-amount estimating subunit 4200 and the amount of free space informed by the free-space-amount detecting subunit 3100.

After being requested to select a recorded data piece, the recorded-data-piece selecting subunit 3300 reads the encoding information sets 2100 stored in the recorded-data storage unit 2000 (Step S200).

If the estimated amount of space informed at the request is equal to or more than predetermined times as large as the amount of free space of the recorded-data storage unit 2000 (Step S210: YES), the recorded-data-piece selecting subunit 3300 determines the necessity of ensuring a considerable amount of free space, and selects a recorded-data-piece name 2110 with the largest amount of data 2140 from the encoding information sets 2100 (Step S230).

If the estimated amount of space is less than predetermined times as large as the amount of free space (Step S210: NO), the recorded-data-piece selecting subunit 3300 determines the necessity of selecting a recorded data piece in terms not of the amount of data, but in terms of causing visually less noticeable degradation in image quality when it is re-encoded. Then, the recorded-data-piece selecting subunit 3300 selects, from the encoding information sets 2100, a recorded-data-piece name 2110 with the largest cumulative motion vector value 2160 (Step S240).

After selecting a recorded data piece, the recorded-data-piece selecting subunit 3300 informs the control unit 3000 of the recorded-data-piece name 2110.

After informed of the recorded-data-piece name 2110, the control unit 3000 then informs the encoding-method deciding subunit 3200 of the informed recorded-data-piece name 2110, and places a request to decide an encoding method.

After requested to decide an encoding method, the encoding-method deciding subunit 3200 decides an encoding method used for re-encoding and the average bit rate based on the encoding method 2120 and the average bit rate 2130 (Step S260) with which the recorded data piece is currently encoded.

For example, if the value of the average bit rate 2130 of the encoding method 2120 "MPEG-2" is reduced to a certain value, the encoding method 2120 is changed to "MPEG-4" so as to further reduce the value of the average bit rate 2130.

After deciding the encoding method, the encoding-method deciding subunit 3200 informs the control unit 3000 of the decided encoding method.

Informed of the encoding method, the control unit 3000 informs the encoding unit 1000 of the recorded-data-piece name 2110 informed by the recorded-data-piece selecting subunit 3300 and the encoding method informed by the encoding-method deciding subunit 3200, and places a request of re-encoding (see Step S110 in FIG. 7).

<3. Re-encoding Process>

Figure 9:
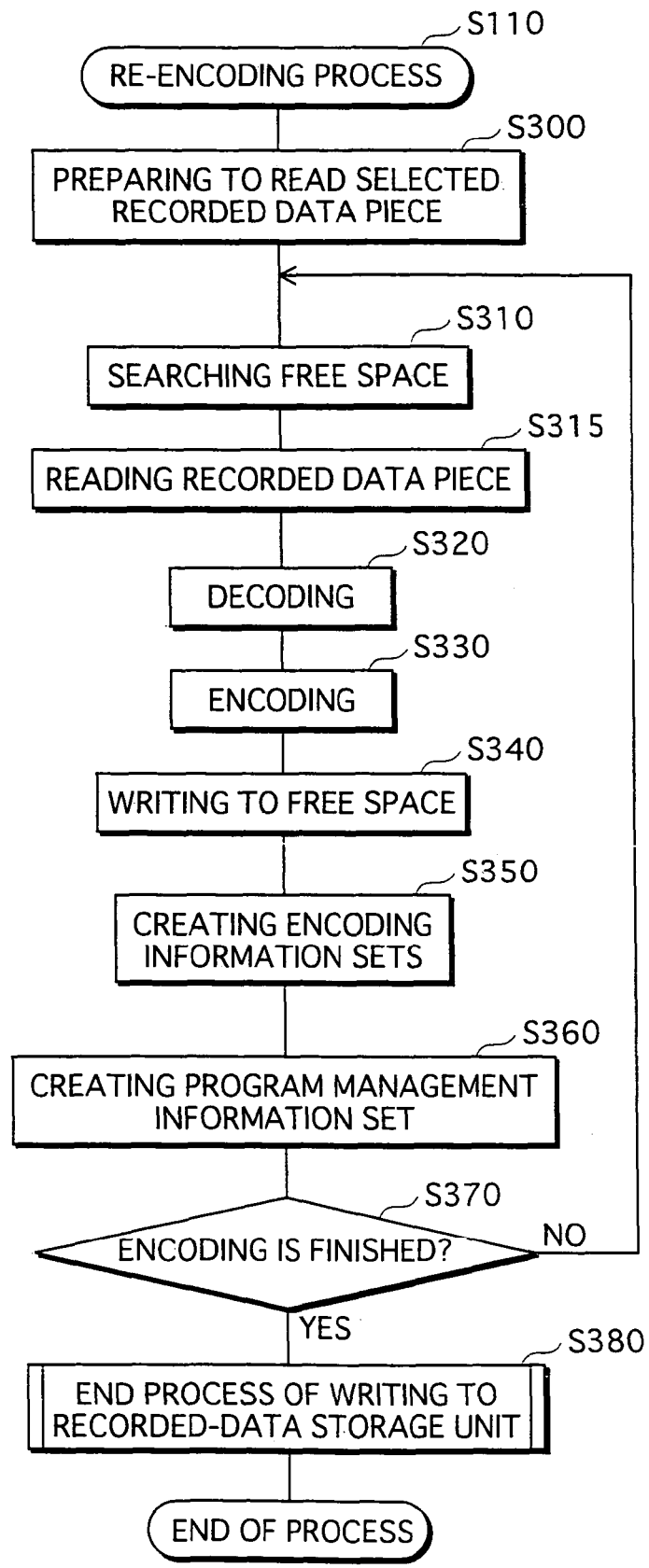
FIG. 9 is a flowchart showing a process for re-encoding of a selected recorded data piece.

Next is described a re-encoding process (Step S110) with the aid of FIG. 9.

FIG. 9 is a flowchart showing the re-encoding process of the selected recorded data piece.

After being requested to perform the re-encoding process, the encoding unit 1000 requests the reproducing unit 5000 to read recorded data pieces. When making the request, the encoding unit 1000 also informs the reproducing unit 5000 of the recorded-data-piece names 2110 informed from the control unit 3000.

After receiving the reading request, the reproducing unit 5000 prepares to read, from the recorded-data storage unit 2000 to work space within the reproducing unit 5000, recorded data pieces of the informed recorded-data-piece names 2110 and the corresponding encoding information sets (Step S300). To be more specific, the preparation includes ensuring work space for reading.

Next, the encoding unit 1000 searches free space in the recorded-data storage unit 2000 (Step S310).

The encoding unit 1000 requests the reproducing unit 5000 to decode the recorded data pieces. At the same time, the encoding unit 1000 requests the encode subunit 1100 to encode encoding-target data pieces informed by the decode subunit 5100, based on the encoding method informed when the re-encoding process was requested from the control unit 3000.

After receiving the request of decoding, the reproducing unit 5000 reads the recorded data pieces to the reading work space (Step S315). The reproducing unit 5000 requests the decode subunit 5100 to decode the read recorded data pieces based on the encoding methods 2120 of the encoding information sets read to the work place. The decode subunit 5100 creates encoding-target data pieces by sequentially decoding the recorded data pieces in the work area, and sends these to the encode subunit 1100 of the encoding unit 1000 (Step S320).

Receiving the encoding-target data pieces, which are decoded recorded data pieces, the encode subunit 1100 sequentially performs the encoding process based on the encoding methods (Step S330), and writes the re-encoded data pieces to the searched free space in the recorded-data storage unit 2000 (Step S340).

The encode subunit 1100 extracts encoding information sets while encoding the encoding-target data pieces. To be more specific, the encode subunit 1100 accumulates motion vectors obtained during the encoding. Additionally, the encode subunit 1100 counts time for the bit rate being exceeding a specified value of the encoding method.

Once the free space is used up, the encode subunit 1100 creates the encoding information sets 2100 corresponding to the searched free space (Step S350), and also creates information (2201 and so on) making up the program management information set 2200 (Step S360).

If all the selected recorded data pieces have been re-encoded (Step S370: YES), the encoding unit 1000 performs an end process of writing to the recorded-data storage unit 2000 (Step S380). If not all of the selected recorded data pieces have been re-encoded (Step S370: NO), the encoding unit 1000 newly searches free space of the recorded-data storage unit 2000 (Step S310), and performs the re-encoding process (Steps 320 to 360).

Figure 10:
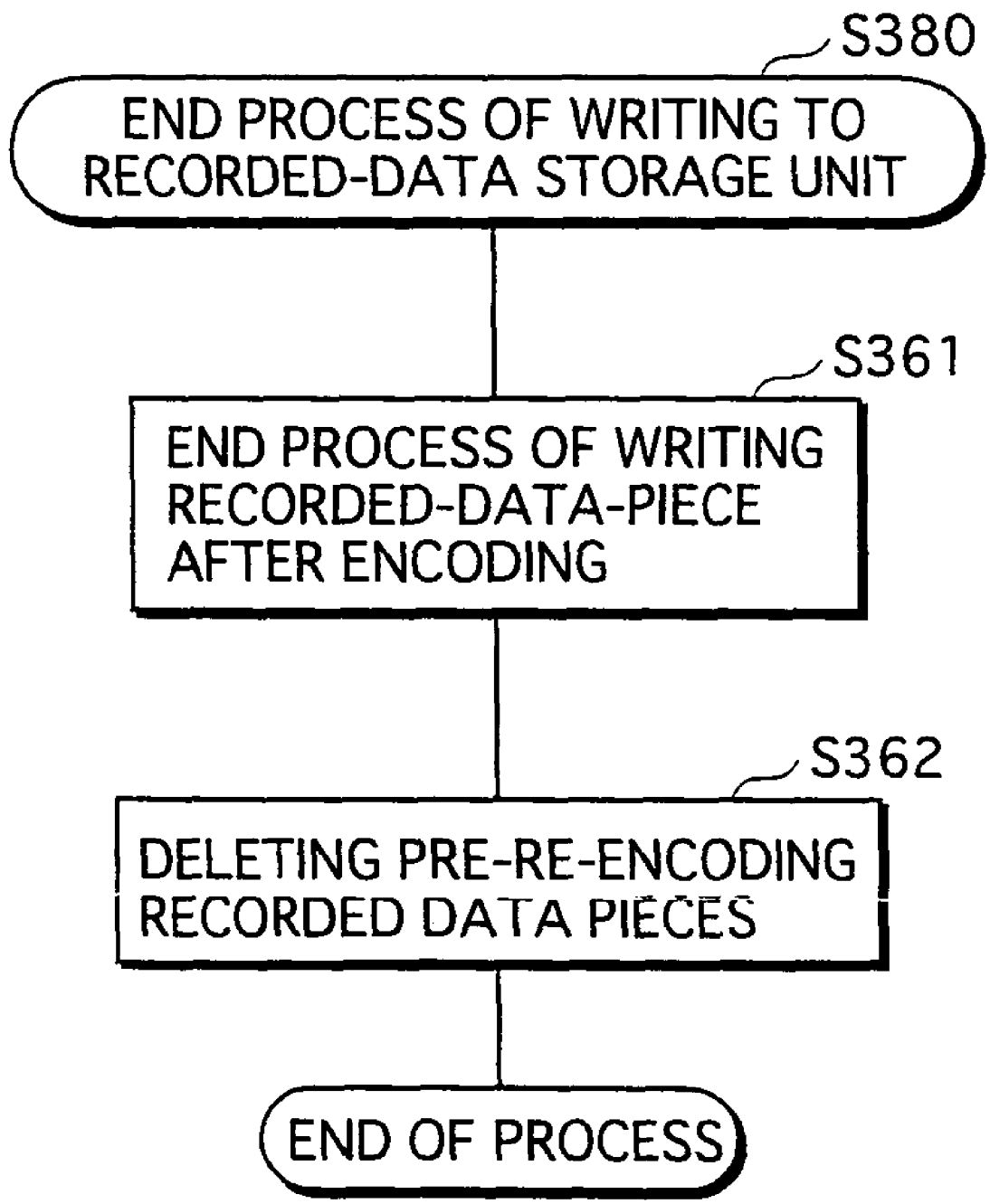
FIG. 10 is a flowchart showing a process for writing re-encoded recorded data pieces.

The end process of writing to the recorded-data storage unit 2000 (Step S380) is described with the aid of FIG. 10.

FIG. 10 is a flowchart showing the writing process of re-encoded recorded data pieces.

After writing the re-encoded recorded data pieces to the recorded-data storage unit 2000, the encoding unit 1000 performs end processing (Step S361). The end processing is, for example, to set the work space free.

Once completing the end processing, the encoding unit 1000 requests the recorded-data storage unit 2000 to delete the pre-re-encoding recorded data pieces.

Receiving the deletion request, the recorded-data storage unit 2000 implements an update to set the corresponding space in the data management space empty (Step S362). Note here that data may actually be deleted from the storage space, or alternatively, only the management space may be updated.

FIGS. 11A and 11B show content examples of an encoding information set 2100 before and after the re-encoding process, respectively.

In this case, "REC002" whose cumulative motion vector value 2160 is the largest is selected and re-encoded.

FIGS. 12A and 12B show content examples of a program management information set before and after the re-encoding process, respectively.

In this case, a recorded data piece of the program name "DRAMA Y" is re-encoded. Data of the program is stored in the recorded data piece "REC100" before the re-encoding; however, it is stored, being divided in two pieces "REC80" and "REC90" after the re-encoding.

FIGS. 13A and 13B show content examples of recorded-data storage unit 2000 before and after the re-encoding process, respectively.

In this case, the recorded data piece "REC100" is stored, being divided in two recorded data pieces "REC90" and "REC80" due to the re-encoding process.

<Modifications>

Figure 14:
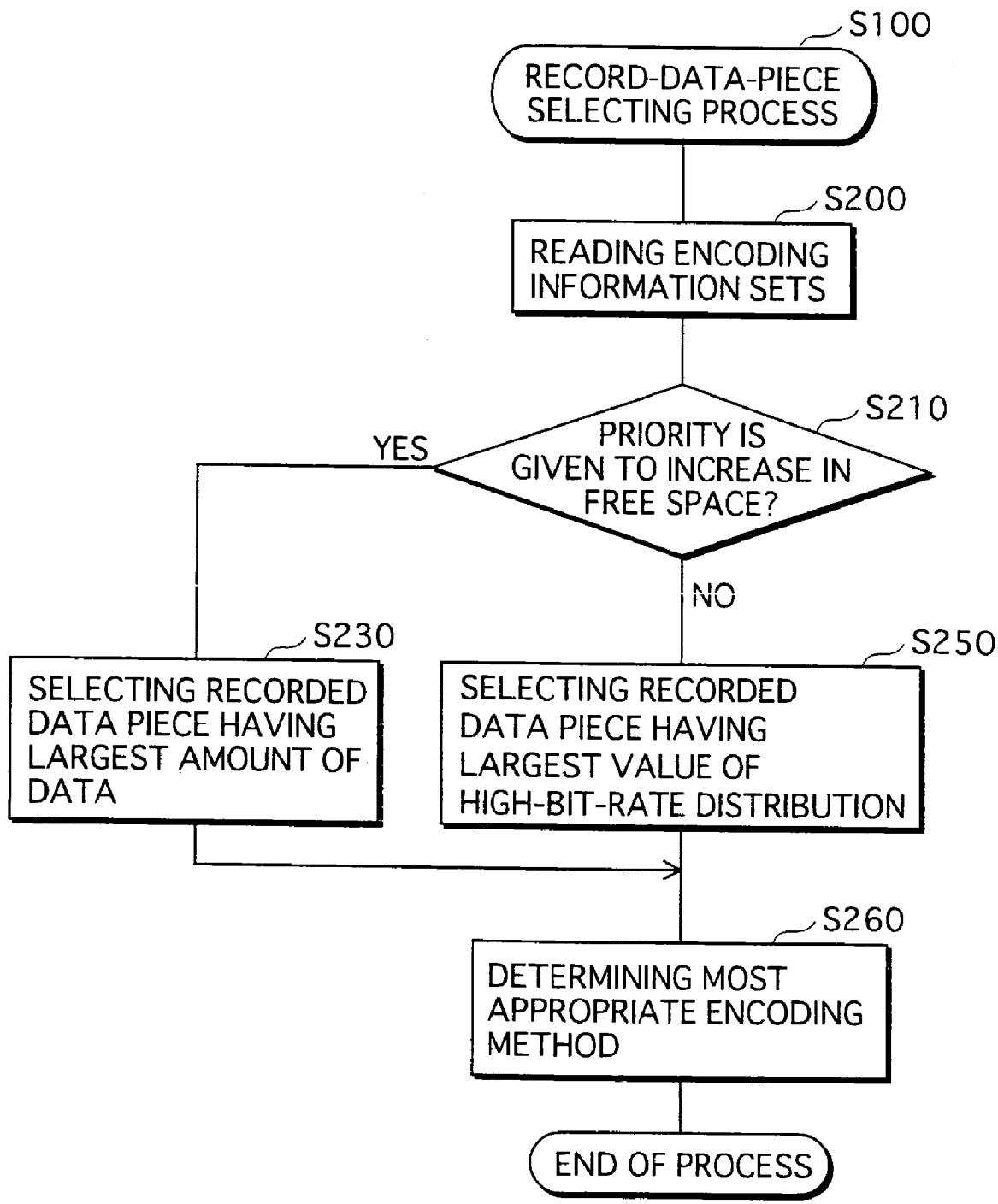
FIG. 14 shows a modification of the recorded-data-piece selecting process (cf.

FIG. 14 shows a modification of the recorded-data-piece selecting process (cf. FIG. 8).

This recorded-data-piece selecting process differs from the above embodiment in selecting a recorded data piece with the largest value of the high-bit-rate distribution 2150 (Step S250), instead of selecting a recorded data piece with the largest cumulative motion vector value 2160 of the encoding information sets 2100.

FIGS. 15A and 15B show content examples of the encoding information sets 2100 before and after the re-encoding process, respectively.

In this case, the recorded data piece "REC001" having the largest high-bit-rate distribution 2150 is selected and re-encoded.

<Additional Particulars>

Thus, the video recording and reproducing apparatus of the present invention has been described based on the preferred embodiment. However, the video recording and reproducing apparatus may be partially modified, and it is a matter of course that the present invention is not limited to the above embodiment.

(1) The video recording and reproducing apparatus 100 of the embodiment records TV broadcast programs; however, it may record services of other distribution forms, for example: wire communications such as CATV (Cable Television), telephone communication, and the Internet; BS (Broadcasting Satellite); CS (Communications Satellite); and terrestrial broadcasting.

(2) In the above embodiment, first a recorded data piece is decoded, and then re-encoded. However, transcode may be used instead. In this case, for example, a transcode unit is provided in the encoding unit 1000, and reads and transcodes a recorded data piece on this occasion, the encoding information sets are extracted.

(3) In the preferred embodiment, analogue TV broadcast signals are received; however, encoded digital data may be received directly.

In this case, the encode subunit 1100 of the encoding unit 1000 does not perform encoding, and the encoded digital data can be directly stored in the recorded-data storage unit 2000. Here, however, there are no encoding information sets. Therefore, the encoding-information creating subunit 1200 may be provided in the reproducing unit 5000 during the reproduction of a program, and encoding information sets may be extracted when decoding is performed by the decode subunit 5100. Or alternatively, encoding information sets may be created during the periodically performed freeing up process or the like.

(4) In the preferred embodiment, the recorded-data-piece selecting subunit 3300 refers to the cumulative motion vector values or the high-bit-rate distributions when selecting a recorded data piece; however, referred items for the selection are not limited to those.

For example, a recorded data piece may be selected by taking into account a genre representing the contents of a program and an image-quality mode specified by the user when the timer recording is set.

In addition, the selection may be made by estimating the compressed volume of each recorded data piece after re-encoding and taking into account the compressed volumes.

Furthermore, both the cumulative motion vector values and the high-bit-rate distributions may be taken into account for the selection.

(5) In the preferred embodiment, free space only for the timer recording programs is ensured; however, a predetermined amount of free space may be ensured instead.

(6) In the preferred embodiment, the recorded-data storage unit 2000 is a built-in HDD (Hard Disk Drive); however, it may be a detachable recording medium, such as a DVD.

All or part of the recorded data pieces and encoding information sets may be stored on the detachable recording medium.

(7) In the preferred embodiment, a cumulative motion vector value is calculated as the amount of changes in video; however, the largest vector value may be calculated instead. In addition, instead of taking the average of accumulated motion vectors at regular time intervals, the largest vector value, from among cumulative values for every ten minutes, may be used for the amount of changes, for example.

(8) In the preferred embodiment, recorded data selected by the recorded-data-piece selecting subunit 3300 is a single recorded data piece; however, the selection may be made on a program basis.

In this case, the recorded-data-piece selecting subunit 3300 selects a program for re-encoding by referring, for example, to encoding methods and cumulative motion vector values of all recorded data pieces making up the program.

As shown in the preferred embodiment, in the case where re-encoding is performed by the recorded data piece, there is an advantageous effect of enabling further efficient compression. On the other hand, in the case of re-encoding by the program, there is a benefit where image quality does not change throughout a program when the program is reproduced for viewing.

(9) In the preferred embodiment, if recorded data of a single program cannot fit in a continuous stretch of free space, the recorded data is divided and stored in more than one section. However, the program may be divided into pieces at predetermined time intervals, and stored in multiple sections.

In this case, the time management is handled by the encoding unit 1000, and the recorded data pieces are stored in the recorded-data storage unit 2000.

In the case when a program is divided because it does not fit a continuous stretch of free space, as in the preferred embodiment, there is an advantageous effect of enabling the recorded-data storage unit 2000 to be used more efficiently. In the case of dividing a program at predetermined time intervals, on the other hand, there is a benefit of enabling further detailed re-encoding—for example, only sections on which re-encoding process is allowed to run can be made targets for re-encoding according to the contents of a program or the like.

(10) The present invention may be a program that causes a CPU to execute each control process for achieving each function of the video recording and reproducing apparatus (see FIG. 1 and others) shown in the preferred embodiment. The program may be circulated by recording it on recording media or distributed via various communication channels. Such recording media include: an IC card; an optical disk, a flexible disk, a ROM, and a flash memory. To be taken for use, the circulated and distributed program is stored in memory readable by the CPU. Each function of the apparatus shown in the preferred embodiment is achieved by the CPU executing the program.

(11) As to the encode subunit 1100 and the encoding-information creating subunit 1200 of the video recording and reproducing apparatus 100, these individual functional blocks are typically achieved by LSIs, which are integrated circuits. These subunits may be formed as individual chips, or part of or the entire subunits may be formed as a single chip.

Here, the term "LSI" is used; however, it may be referred to as an IC, a system LSI, a super LSI, or an ultra LSI, depending on the degree of integration.

A method of forming an integrated circuit is not limited to LSIs, and this may be accomplished using special circuits or a general-purpose processor. In addition, the following may be used: a FPGA (Field Programmable Gate Array) which is programmable after the manufacture of LSIs; and a reconfigurable processor in which the connection and setting of circuit cells inside an LSI can be reconfigured.

If technology for forming integrated circuits that replaces LSIs is introduced, owing to advance in semiconductor technology or different technology derived therefrom, the integration of functional blocks may naturally be accomplished using such technology. There is also a possibility of application of biotechnology to the integrated circuit technology.

INDUSTRIAL APPLICABILITY

The present invention is useful for a recording apparatus for recording video data, in particular for maintaining visual image quality of a reproduced video after the amounts of the video data are reduced.

What is claimed is:

1. A recording apparatus comprising:

a storage unit operable to store one or more recorded data pieces, each of which is created by encoding a video data piece, and one or more encoding information sets, each of which is information extracted when a different one of the video data pieces is encoded and represents characteristics of the video data piece, the recorded data pieces being stored in one-to-one correspondence with the encoding information sets;

a selecting unit operable to select a recorded data piece based on the stored encoding information sets; and an encoding unit operable to (i) create a re-encoded data piece by re-encoding the selected recorded data piece using a predetermined encoding method, (ii) extract a corresponding re-encoding information set in a course of creating the re-encoded data piece, and (iii) store, in the storage unit, (a) the re-encoded data piece which replaces the selected recorded data piece and (b) the re-encoding information set which replaces an encoding information set corresponding to the selected recorded data piece, wherein:

the predetermined encoding method causes a size of the re-encoded data piece to be smaller than a size of the selected recorded data piece, each of the stored encoding information sets includes a magnitude of change which is a numerical representation of changes in a video reproduced from a video data piece of a corresponding recorded data piece, the selecting unit selects the recorded data piece based on magnitudes of change included in the stored encoding information sets, the magnitude of change is a motion vector value representing inter-frame displacement of the video data piece, and the selecting unit selects the recorded data piece, a corresponding encoding information set of which includes a larger motion vector value than a predetermined value.

* * * * *